No. 694,092. Patented Feb. 25, 1902.
E. DANIELSON.
ALTERNATING ELECTRIC CURRENT INDUCTION MACHINE.
(Application filed June 11, 1901.)
(No Model.)
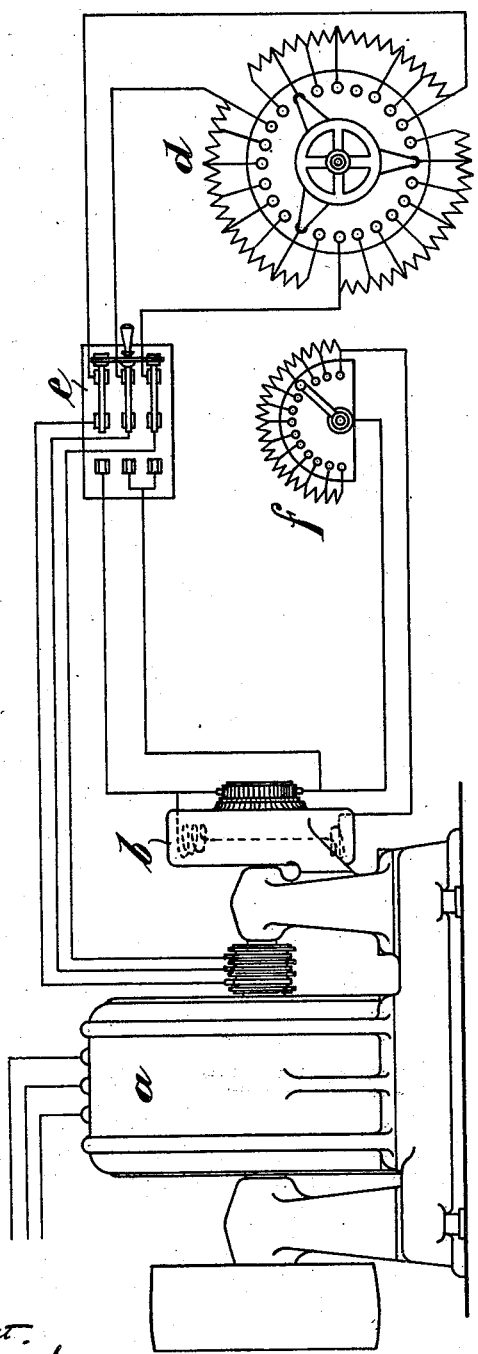
Witnesses:
Gustaf Tsfäu.
Inda Lindkvist.
Inventor:
Ernst Danielson
by Olofdahl
his att'y
THE NORRIS PETERS CO., PHOTO-LITHO., WASHINGTON, D. C.

UNITED STATES PATENT OFFICE.

ERNST DANIELSON, OF WESTERÅS, SWEDEN.

ALTERNATING-ELECTRIC-CURRENT INDUCTION-MACHINE.

SPECIFICATION forming part of Letters Patent No. 694,092, dated February 25, 1902.

Application filed June 11, 1901. Serial No. 64,193. (No model.)

*To all whom it may concern:*

Be it known that I, ERNST DANIELSON, a subject of the King of Sweden and Norway, and a resident of Westerås, Sweden, have invented a new and useful Improvement in Alternating-Electric-Current Induction-Machines, of which the following is a specification, reference being had to the drawing accompanying and forming a part hereof.

Ever since the practical application of multiphase systems has become extended as a result of the ease with which they are managed a desideratum has been to set a limit to the changes in the phase relation of current and electromotive force, which are inevitable in these systems when loaded by induction-motors only. It has long been known that the said lag may be eliminated by using overmagnetized synchronous motors, this method having found application in individual instances. The difficulty of starting synchronous motors, however, has constituted an inconvenience of importance and in most cases prohibited their use.

The object of this invention is to produce a motor which combines the good features of the synchronous motor and the induction-motor, while not possessing their respective disadvantages.

The invention consists, briefly, in combining with an ordinary induction-motor and a suitable resistance for connecting to the secondary element of said motor, a source of continuous electric currents, a switch arrangement so connected that the secondary part of the motor may by means of said switch arrangement either be connected to the said resistance or to the said source of continuous currents, and a regulator for regulating the strength of the exciting-current from said source of continuous currents. In starting the motor the said resistance is connected in the ordinary manner in series with the windings of the secondary element of the motor, so that the motor starts up to a speed corresponding to a few per cent. less than the synchronous speed, the motor then operating in exactly the same manner as any other asynchronous motor. By means of the said switch an exciting-current—*i. e.*, a continuous current—is subsequently supplied from the said source of continuous currents to the secondary element of the motor, this being conveniently accomplished—supposing the secondary element to be for three phases and star-connected, for instance—by connecting the positive pole of the exciting-machine with one of the contacts and the negative pole with the two others. It is easily understood that in such a manner the continuous current employed in the excitation will be so distributed that the current strength in the coils belonging to one phase will be twice that in each of the others, which accurately corresponds to the distribution of current maintained at certain moments when the coils are traversed by three-phase alternating currents. When the exciting-current is supplied, the motor is changed from an asynchronous to a synchronous one, provided, however, that the exciting-current is strong enough to pull the motor in step. By suitable adjustment of the exciting-current the phase relations of current and electromotive force of the motor can subsequently be regulated within wide limits, such lags, (shifting of phases,) however, as are generally termed "positive"—*i. e.*, in which the current lags behind the electromotive force while not desirable are not easily obtainable, owing to the tendency of the motor in such cases to fall out of its synchronism for the slightest excess of load. In practice it appears to be advantageous to make the excitation strong enough to cause the motor when the load is normal to work with a slight negative lag—*i. e.*, the current leading the electromotive force corresponding, for instance, to cos. $\varphi = 0.9$ or $0.95$—in which case while the motor partly compensates the lag caused by other motors in the system its current strength will not much exceed that required were it to work entirely without any shifting of phases. If the load of the motor be subsequently reduced while retaining the same degree of excitation, which appears to be a good plan for the sake of simplicity of management, the wattless component of the motor-current will be increased and its favorable influence on the remainder of the system will be augmented.

In the accompanying drawing the figure shows diagrammatically a side view of a motor of the kind referred to and its connections according to this invention.

Referring to the drawing, $a$ represents an ordinary three-phase induction-motor. A continuous-current generator (exciter) $b$ is mechanically connected to the said motor, so as to be driven by the same. The contact-arms of a double-throw triple-pole switch $e$ are connected to the secondary winding of said induction-motor through the usual contact rings and brushes. The contacts of one side of said switch are connected to a resistance and short-circuiting device $d$ and the contacts of the other side to the said exciter, which is provided with a shunt resistance $f$ for regulating the strength of the exciting-current.

The motor is operated as follows: In starting the switch is thrown to the left side, so as to connect the starting resistance in series with the windings of the rotator, (secondary element of the motor,) whereby a normal starting torque at normal current is obtained. As the speed of the rotator rises the resistance is gradually lessened until the windings of the rotator are short-circuited, when the rotator runs near synchronism. The switch is then thrown over to the other side, so that the one terminal of the said exciter becomes connected to one contact-ring of the rotator and the other terminal to both of the other contact-rings, as shown in the drawing. By the influence of this exciting-current the motor changes into a synchronous motor. The exciting-current may be regulated by means of the said shunt resistance. Should in the case of an excess of load such a synchronously-running asynchronous motor fall out of its synchronism, it does not stop running, as an ordinary synchronous motor would do, but continues running, but as an asynchronous motor until the excess of load is removed, when it automatically resumes its synchronous movement.

It is evident that the system here proposed not only is applicable to multiphase and single-phase motors, but also to rotary transformers, in which latter case it is only necessary to connect externally the terminals of the continuous-current circuit to the said switch and that the above-mentioned connection of the windings of the rotator can be modified in various ways for producing in the main the same result. It is also evident that any induction-motor, the secondary core of which is provided with terminals for the introduction of resistance, can be combined with an exciting-machine, if only the electromotive force of the latter be properly adjusted.

The invention may of course also be applied to motors having a rotary primary part and a stationary secondary part. It is, moreover, evident that the same purpose as described above can be attained by supplying to the secondary part of the motor a continuous current of suitable voltage derived from any source whatever.

Having now described my invention and how it may be carried out, what I claim as my invention, and desire to secure by United States Letters Patent, is—

1. The combination with an alternating-current induction-machine, of a source of continuous electric currents, a rheostat, a switch connected to the secondary winding of said machine, the said source of continuous currents and to the said rheostat, substantially as and for the purpose set forth.

2. The combination with an alternating-current induction-machine, of a source of continuous electric currents, a rheostat, a switch connected to the secondary winding of said machine, to the said source of continuous currents, and to the said rheostat, and a regulating device in the circuit of said source of continuous currents, substantially as and for the purpose set forth.

In witness whereof I have hereunto signed my name in the presence of two subscribing witnesses.

ERNST DANIELSON.

Witnesses:
GERDA LINDKVIST,
GUSTAF TSPAU.